Aug. 26, 1969

R. A. HARTE 3,463,142

BLOOD CONTENT MONITOR

Filed July 5, 1966

Richard A. Harte,
INVENTOR.
BY.

James H. Griffin
ATTORNEY.

though it might be adequate for preliminary screening of a prospective defendant, is not considered reliable as legal evidence by some authorities, and it is an awkward precedure that does not permit instantaneous, real time read out in the field.

United States Patent Office 3,463,142
Patented Aug. 26, 1969

3,463,142
BLOOD CONTENT MONITOR
Richard A. Harte, Los Angeles, Calif., assignor to TRW, Inc., Redondo Beach, Calif., a corporation of California
Filed July 5, 1966, Ser. No. 562,590
Int. Cl. A61b 5/00; G01n 33/16
U.S. Cl. 128—2                                    2 Claims

ABSTRACT OF THE DISCLOSURE

An intense collimated beam of light is passed through the fingertip of an individual causing the entire end of the digit to glow red which is caused by the diffusely transmitted and internally scattered light through the red pigment. A narrow band spectral filter centered on an ethyl alcohol-near infrared absorption band is interposed in the light path. Energy levels will fall if absorption takes place due to the presence of alcohol in the blood. Another filter, alternating with the first, isolates an infrared band close to the absorption band but is relatively transparent to alcohol. A calibration source permits adsolute measurements of energy transmitted in the two bands which in turn can be calibrated to the amount of alcohol present. This apparatus is useful in other field tests, for example, diabetes detection and narcotics investigation, by the mere change of the filters.

---

This invention relates to the analysis of blood or other fluids in order to determine their specific content of alcohol, narcotics, acetone (diabetes), or various other substances. The preferred embodiment of this invention discussed in detail herein will relate to a blood alcohol monitor, because that is the type of device selected for the first reduction to practice of the invention; but it should be appreciated that the scope of the invention extends to any type of fluid analysis in which the inventive principle is employed.

At the present time, the usual tests given in the United States to determine the amount of alcohol in the blood of a suspected drunken driver or other such offender includes breath analysis and urine analysis. Both methods have their shortcomings, mainly because such tests are not truly accurate and difficult to administer reliably. A level of alcohol content above 0.15%, the blood alcohol content usually considered sufficient for purposes of defining a legal offender, should be proved accurately and without probability of error. However, breath analysis using a balloon or other container into which the person being analyzed must breathe, although it might be adequate for preliminary screening of a prospective defendant, is not considered reliable as legal evidence by some authorities, and it is an awkward precedure that does not permit instantaneous, real time read out in the field.

Urine analysis can be of value, but the test must be administered quite exactly in order for the results to be reliable. In particular, a urine specimen must be analyzed within the first thirty minutes after alcohol is ingested to give a true indication of the alchol content; yet the performance of such analyses is not ordinarily called for until long after this time. Moreover, with both the urine analysis and breath analysis, there are difficulties in getting the prospective offender to cooperate in the administration of the test.

Especially with the urine test, administration at the scene of an accident is not very feasible, and the ability to determine the reading of blood alcohol at the scene of an accident or arrest instead of minutes to hours later at the precinct house or hospital is considered very advantageous.

It is the main object of the instant invention, therefore, to provide improvements in fluid analysis; and as related to the blood analysis field, the invention has the more specific object of providing a technique and associated devices which can measure directly and accurately blood alcohol level, using a small, portable field device which can be carried in a squad car. Other advantages of the invention are that blood analysis by this method will cause no inconvenience or embarassment to police officers or the offender being analyzed and will give an immediate and direct readout which can be monitored by the officers or recorded to make a permanent record, which would satisfy legal "tamperproof" requirements.

In the achievement in the above and other objects the invention features the spectral analysis of radiation passing through a human finger or some other container for the fluid to be analyzed. A narrow band spectral filter centered on an ethyl alcohol-near infrared absorption band is imposed in the path of the light, so that the total energy of the total radiation passing through the fluid to be analyzed will fall because of the absorption caused by the presence of alcohol in the blood. Another filter alternating with the first isolates an infrared reference band close to the absorption band but relatively transparent to alcohol.

Behind the filters is a radiation detector, which produces an electrical signal indicative of the amount of energy of the radiation passing through the fluid. The electrical signal from the sensitive detector is then used to actuate a readout instrument, which may take varying forms depending upon the implementation of the broad principles of the invention.

For example, one readout source would provide an absolute measurement of the energy transmitted first by the alcohol filter and then by the reference filter. This would require that the operator of the analyzer, record the readings for each band and then calculate the amount of alcohol present. According to another principle of the instant invention, a direct reading of the amount of blood alcohol present can be obtained by dithering the reference filter and the alcohol filter across the radiation path; so that the level of the electrical signal from the sensitive detector is indicative of the difference between the ethyl alcohol-filtered radiation intensity and the reference radiation intensity.

The invention when applied to the analysis of blood for alcoholic content depends upon the fact that alcohol exhibits very strong absorption of infrared light at 2.2, 2.6, and 3.39 microns (and also in other regions such as ultraviolet). Water, on the other hand, is absorbent at 2.7 microns and some other regions but is relatively transparent to many other frequencies. Since both human tissue and blood have a very high water content, the principles of this invention provide a very simple, quick, and inexpensive way of analyzing the blood or tissue for the presence of any substance other than water. Thus, the invention could be used for police work, not only for blood alcohol content analysis, but also for the determination and specific identification of narcotics, poisons, stimulants, or various other foreign substances. For medical and first aid purposes, analysis using the device described herein will be far quicker and cheaper to administer and will not require the extraction of a blood sample or the collection of a urine specimen and the delay involved in performing tests thereon.

A typical medical use suggested in the detection of acetone, indicative of diabetic metabolism.

Other objects of the instant invention and a better under standing thereof may be had by referring to the following description and claims taken in conjunction with the accompanying drawings in which:

Figure 1:
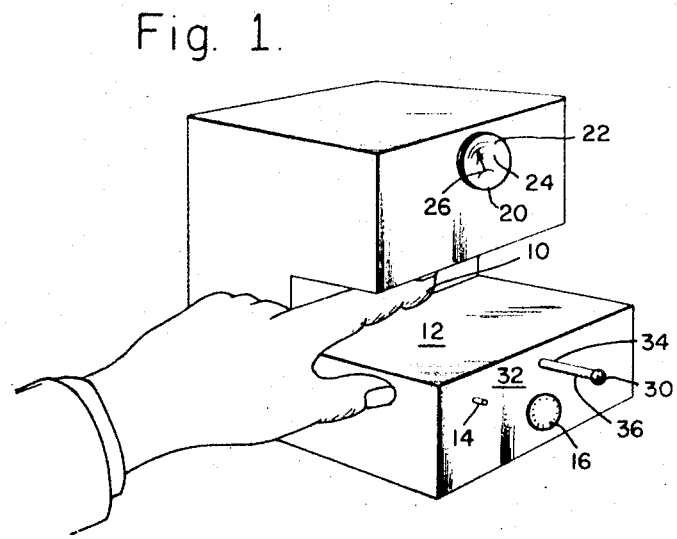
FIGURE 1 is a prospective view of a blood alcohol monitor built according to the principles of the instant invention.

Referring to FIGURE 1, the preferred embodiment of the principles of the instant invention shown therein is specifically designed to analyze the alcohol content of human blood by passing collimated light through a finger 10 or other extremity of the subject. The blood alcohol monitor set of FIGURE 1 has a transparent receiving surface 12 for receiving the light passing through the finger 10. A switch 14 serves to activate the electrical signal of the blood alcohol monitor, while a calibration knob 16 regulates the intensity of light applied to the finger 10.

In order to read out an indication of the intensity of radiation passing through the finger 10, there is provided a readout meter 20 having two scales 22 and 24 and a needle 26. The readout meter 20 in the blood alcohol monitor, FIGURE 1, provides a first reading when a narrow band spectral filter centered on the ethyl alcohol-near infrared absorption band is placed across the path of the light passing through the finger 10; and then another reading is provided when a reference filter centered upon an infrared band close to the absorption band of ethyl alcohol but relatively transparent to alcohol and water (blood) is provided in the path of the light through the finger 10. By comparing the energy level indicated by the needle 26 for radiation passing through each of the two filters, a difference can be obtained which indicates the amount of radiation absorption being caused by the presence of ethyl alcohol in the blood passing through the finger 10.

In order to alternate filters to provide the difference reading on the dial 20, a filter selector rod 30 passes into the front panel 32 of the blood alcohol monitor set of FIGURE 1. The filter selector rod 30 has two notches, 34 and 36, each of which is related to the position of one of the two filters mentioned above: the ethyl alcohol-near infrared narrow band spectral filter or the reference filter. In the operation of the blood alcohol monitor of FIGURE 1, therefore, the finger or other digit of the subject is simply placed between the light source (not shown) and the transparent surface 12, following which the filter selector rod 30 is alternately inserted to the position 34 and the position 36, whereupon readings by the needle 26 indicate the intensity of energy transmitted for each filter.

Since the narrow band filters controlled by the selector rod 30 are in closely-proximate infrared bands, the intensity of energy transmitted by filter if absorption did not take place in the finger 10 would be about the same.

On the other hand, if the presence of ethyl alcohol in the blood passing through the finger 10 causes energy absorption to take place, the ethyl alcohol filter will pass a decreased amount of energy thus producing a lower reading on the readout meter 20. In other words, the reference filter is selected in an infrared band where ethyl alcohol does not have an absorptive effect; so that the reference filter will continue to pass radiation at the same intensity regardless of the amount of ethyl alcohol present in the blood in the finger 10. Thus, the difference between the radiation intensity passed by the ethyl alcohol filter and the radiation intensity passed by the reference filter gives an indication of the amount of absorption taking place due to the presence of alcohol in the finger 10, and thus ultimately an indication of the amount of alcohol present.

To be more particular, all alcohols demonstrate marked infrared absorption at 2.2 microns, 2.6 microns, and between 3.0 microns and 3.4 microns wavelengths; while water is quite transparent in these regions, having, for example, a transmittance of 0.833 for a 10 millimeter thickness of water at 3.2 microns and a transmittance of 0.35 for a 1.0 centimeter thickness of water at 3.2 microns. The technique of this invention when performing blood alcohol analysis, therefore, depends upon the transparency of water at the above mentioned frequencies and upon the high water content of the human tissue and the blood in the finger 10 of FIGURE 1. Moreover, the 0.15% blood alcohol level, although small, has proved to be easily discernible from a no-alcohol level.

Figure 2:
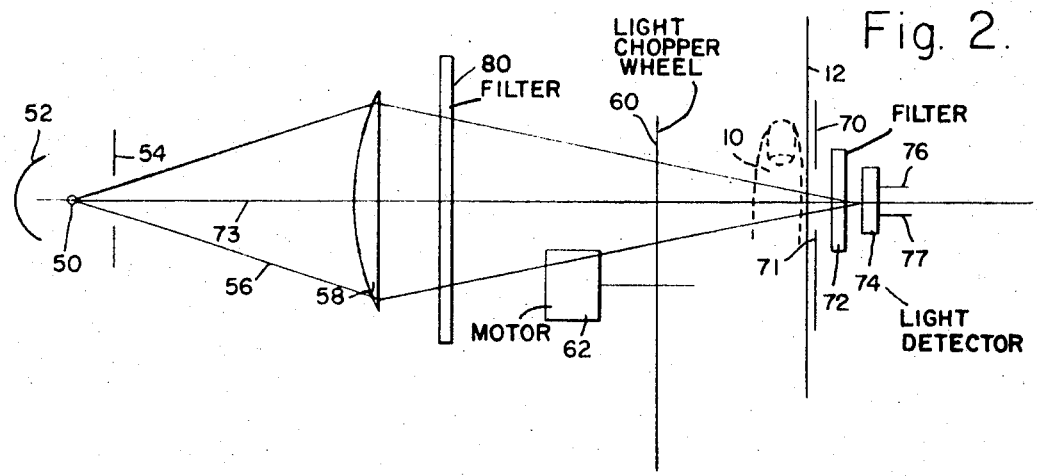
FIGURE 2 is a schematic representation of the optical circuitry of the blood alcohol monitor of FIGURE 1.

Referring to FIGURE 2, the schematic optical circuit for practicing the invention shown therein begins with a source of radiation 50, which in the reduction to practice of the invention was an intense tungsten iodine lamp, providing many watts of radiation at a black body color temperature of 3,000° K. A reflector 52 mounted behind the source 50 helps to collimate or even slightly converge the radiation from the source 50 onto the finger 10.

Forward of the source 50 is an aperture plate 54 having an opening 56 for the passage of light of about 1 centimeter diameter. Light passing through the opening 56 is condensed by a lens 58 having a focal length that is approximately at the thumb 10. Before the light from the lens 58 reaches the thumb 10, however, it passes through a chopper wheel 60 actuated by a motor 62, to provide a relatively low frequency modulation of the light from 50 (e.g., about 210 c.p.s.).

The light from the chopper wheel 60 then passes through the finger 10 and the transparent plate 12 (window or aperture) to a receiving optical apparatus consisting of an aperture plate 70, one of more filters 72 and a light intensity detector 74 having electrical leads 76 and 77 passing through outside circuitry not shown in FIGURE 2. The aperture plate 70 has a small aperture 71 which passes light from the source 50, while the remainder of the plate 70 prevents spurious light from reaching the detector 74. The filters 72 are of the narrow spectral band type, as discussed in connection with FIGURE 1; so that all the spectral frequencies of the light rays 73 from the source 50 are blocked except those spectral frequencies of specific interest in analyzing the blood in the finger 10. After narrow band filtering at 72, the remainder of the light ray 73 impinges upon the detector 74, which may be any of a wide variety of devices which change the electrical characteristics across the leads 76–77 in response to the intensity of light applied thereto.

An optical filter 80 in series with the light path 73 may be provided "upstream" from the finger 10 to eliminate all radiant energy save that in the bands passed by the filter 72, or the filter 80 may at least eliminate sufficient energy to prevent overheating of the finger 10 being analyzed. For example, in the reduction to practice of the instant invention an infrared filter was used which eliminated most of the energy frequency components having wavelengths below 1.2 microns. It was found quite sufficient to prevent heating of fingers placed in the light path 73 for blood analysis.

It is an added feature of the instant invention to provide a dual filter system at 72 that alternates an alcohol absorption band filter and a reference filter across the light path 73 in vary rapid succession. In the reduction to practice, a tuning fork was used with the two interference filters mounted thereon; the tuning fork amplitude was sufficient to place one filter, then the other, in succession entirely across the aperture 71. The vibration rate of the tuning fork was optimized for the sensitivity of the detector 74; for example, with the thermistor-bolometer detector used in the reduction to practice, a tuning fork vibration rate of about 10 to 50 c.p.s. provided satisfactory operation. An electrical pickoff from the fork can then be used to provide a synchronized signal voltage for the electronics of the monitor set.

With the above described tuning fork arrangement, comparator electronics can be provided which will derive a single continuous meter reading of the percentage difference between the two special bands passed by the filters at 72. The dial shown at 20 in FIGURE 1 can then be calibrated to read directly in percent alcohol content. Because of the difference between individuals in the amount of blood fluid in the finger, an automatic gain control (AGC) circuit should be provided in the comparator electronics to set the reference band radiation intensity electrical signal at some nominal 100% value that will not change from subject to subject.

In order to check out the operability and calibration of the system such as that shown in FIGURE 1 or 2, one or more standard "calibrated fingers" of quartz glass or some similar material and containing known quantites of fluid should be supplied with each monitor set along with instructions as to the exact steps to perform instrument check out using the calibrated finger.

Figure 3:
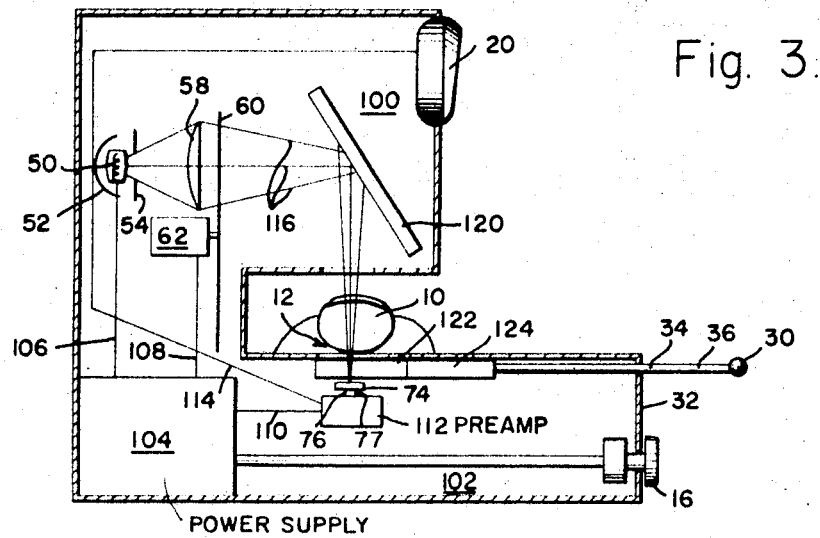
FIGURE 3 is a cross section schematic of the blood alcohol monitor of FIGURE 1.

Referring to FIGURE 3, this side elevation in cutaway of the blood alcohol monitor of FIGURE 1 shows the subject's finger 10 lying on the transparent surface 12, in position for blood alcohol analysis. In general, the apparatus for passing light into the finger 10 is located in that portion of the outer case 100 above the finger 10; while the light receiving and analyzing equipment is in that portion of the case 102 below the finger 10. Power for various portions of the system is supplied by a 28 volt DC supply 104. An electrical lead 106 carries power from 104 to the light source 50, while an electrical lead 108 powers the motor 62 for the chopper wheel 60. An electrical lead 110 supplies power to a preamp 112, which serves to amplify electrical signals arising across the leads 76 and 77 as the result of the reception of radiant energy by the lead sulfide detector 74. A line 114 carries the output of the preamp 112 to the readout meter 20 to cause the needle 26 to provide an indication of alcohol content in the blood of the finger 10. It should be added at this point that when analyzing a human member, such as the finger 10, the radiation 116 from the source 50 passes through the human tissue of the finger 10 as well as the blood running through, so that radiation is absorbed by alcohol in the tissue as well as in the blood. However, after a short equilibrium period the relation of alcohol absorption in tissue to the amount of alcohol present in the blood is so close that the alcohol content information provided at the meter 20 is not distorted thereby.

The blood alcohol monitor of Figure 3 can be seen to have an optical circuit beginning at the light source 50 and reflector 52 and passing through the aperture plate 54 to a focusing lens 58. The focusing lens focuses the rays 116 in such a manner that they are nearly collimated or are made to converge, after being reflected at 120, upon the finger 10 or shortly behind the finger 10. Just beneath the finger 10 are two filters 122 and 124 which are controlled by the filter selector rod 30. When the rod is pulled out such that the inner notch 34 is approximately at the face 32 through which the rod 30 passes, then the filter 122, the ethyl-alcohol absorption band filter, is in optical alignment with the light source 50, the finger 10, and the detector 74. After a reading has been received with the filter 122 in optical alignment, the monitor, set operator may push the rod 30 in until the notch 36 is nearer the face 32, to place the reference filter 124 in optical series with the light beams 116. The reference filter 124 will give a radiation intensity reading from the detector 74 that is unaffected by alcohol-absorption effects. Comparison of the absorption reading when the alcohol-absorptive band filter 122 is in optical series and the nonabsorptive reading when the reference filter 124 is in optical series will give an indication of how much absorption took place in the finger due to the presence of alcohol in the blood stream (and in the finger tissue). It is suggested that a punched readout of the two values be automatically recorded so that there can be no question of accidental or deliberate tampering to alter the reading. The printed readout alongside the printed 100% readout through the reference filter will enhance legal acceptability.

Figure 4A:
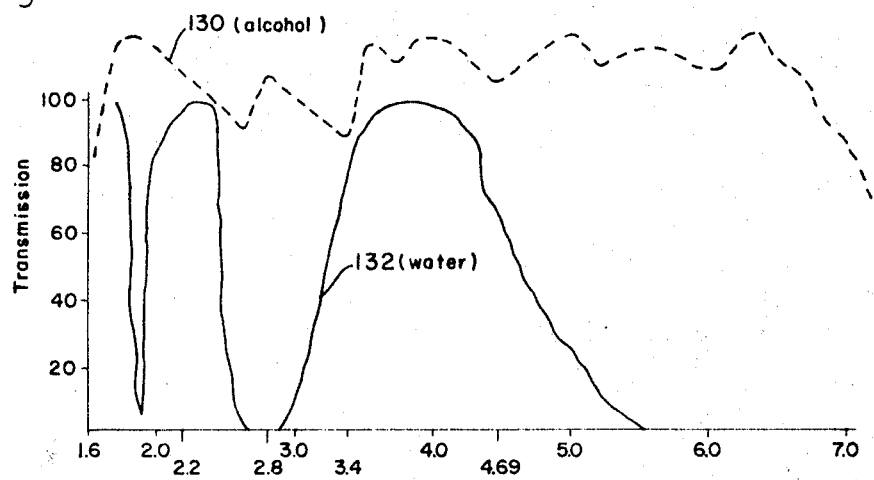
FIGURE 4 is an illustration using a series of graphs of wavelength versus percentage light transmission of the principles of the blood alcohol monitor of FIGURE 1.

Referring to FIGURE 4, the graphs of part (a) thereof show the percentage of radiation transmission as a function of wavelength of alcohol (the line 130) and of water (the line 132). At the 2.2, 2.6, or 3.4 micron low-transmission points of alcohol, water has good transmittance; while at 1.6 microns wavelength, alcohol has good transmissivity. Using these properties, the filters 122 and 124 of FIGURE 3 can be chosen as follows:

Filter 122 which is the alcohol absorption filter would best be chosen with its pass band at 2.2 microns (or 2.6 or 3.39 microns), so that the radiation passing therethrough is at a frequency that would suffer heavy absorption in alcohol but would be readily passed by water. On the other hand, the reference filter 124 should be chosen at about 1.6 microns, because there both water 134 and alcohol 130 show high transmissivity.

It should be obvious that the principles of the invention comprehend other absorption band and reference band wavelengths than those specified above; and moreover, for the detection of substances other than alcohol (e.g., narcotics, poisons, or inhaled gasses), other bands would be needed. The general principles of the selection would always be the same: (1) the absorption band should be one where water, blood, and tissue are relatively transparent; (2) the absorption band should be one where only the substance to be detected will absorb radiation, so that no ambiguity is possible; (3) the reference band should be one where both the substance to be detected and also water, blood, and tissue are relatively transparent; and (4) the reference band should be sufficiently near the absorption band that the energy contained in each band is the same before absorptive effects.

Figure 4B:
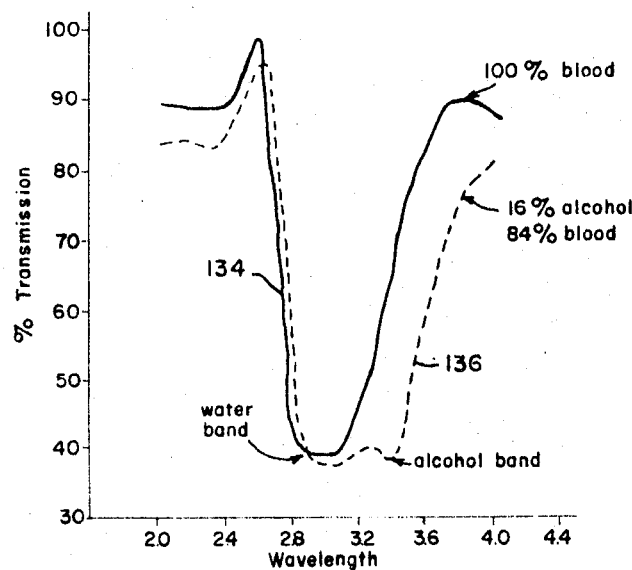

Referring to FIGURE 4(b), the graph of wavelength in microns versus percentage transmission shown therein is an example of the result obtained by a test system of the configuration shown in FIGURE 2, both when passing radiation through pure water (the line 134) and when passing radiation through a mixture of ethyl alcohol and blood (the dotted line 136). It can be seen that the presence of alcohol in the water mixture makes a vast difference in the overall transmissivity of the mixture in the region between 3.0 microns and 3.8 microns.

Figure 4C:
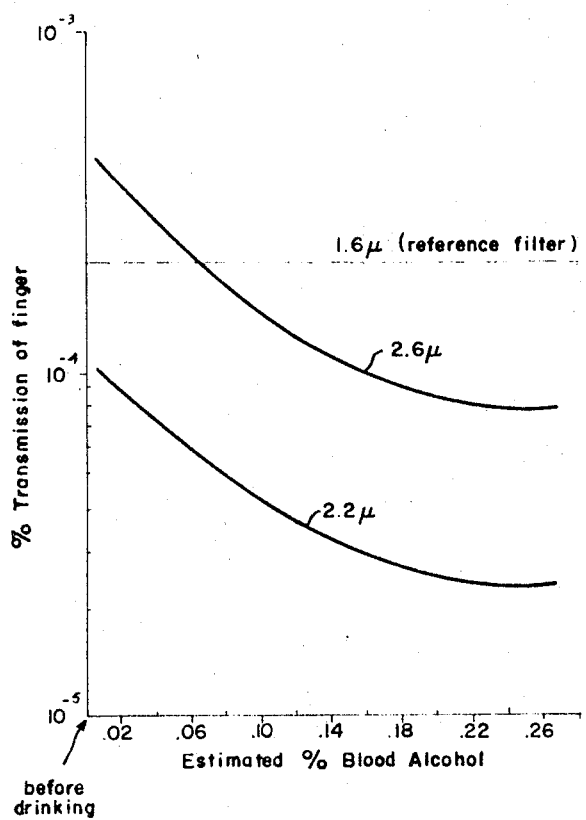

FIGURE 4(c) is another graph of wavelength versus percent transmissivity showing experimental results when a finger of the same subject is analyzed before drinking any alcoholic beverages and then after drinking a substantial amount of alcoholic beverage. The reference band (1.6 microns) indicates no changing in finger transmission with increasing blood alcohol, while the two monitoring bands (2.6 microns and 2.2 microns) show changing transmission values.

Figure 5:
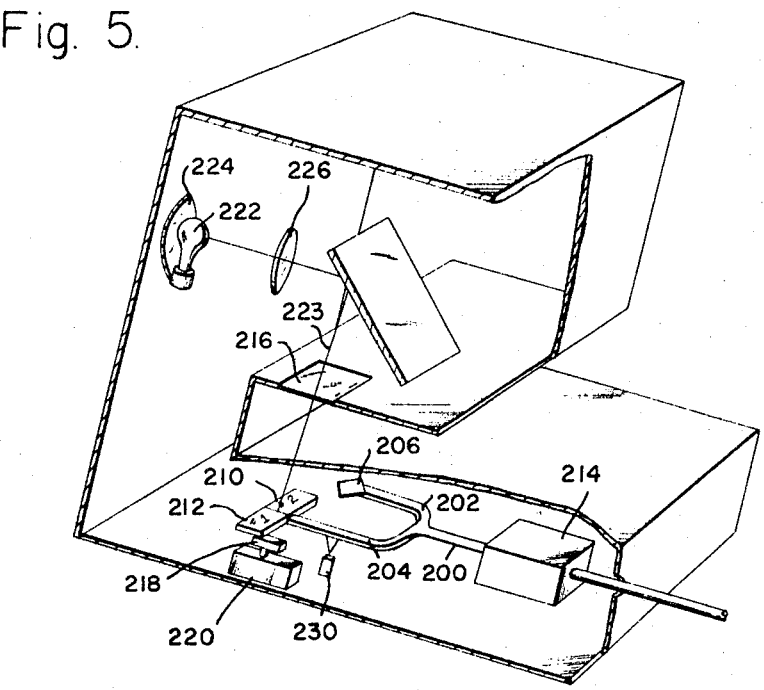
FIGURE 5 is an alternative embodiment of the broad principles of the invention, using more specific new principles to provide an improved readout capability for fluid analyzers.

Referring to FIGURE 5, the alternative embodiment of the principles of the invention as shown there employs a tuning fork 200 having two prongs 202 and 204. The prong 202 has a dummy load 206 mounted thereon, while the prong 204 carries two filters 210 and 212, similar to the filters 122 and 124 of FIGURE 3. The filter 210, therefore, is a band pass filter which passes only radiation of a wavelength which is heavily absorbed by blood alcohol; while the filter 212 is a reference filter passing a nearby band. An electrical-mechanical transducer 214 causes the tuning fork 200 to vibrate at its fundamental frequency, so that the filter 210 and 212 alternately pass through the line between an aperture 216 for passing radiation through the finger 10 and a sensor 218, such as a thermistor-bolometer. The thermistor-bolometer 218 is electrically connected to a preamplifier 220, as was the case in the meter of FIGURE 3.

A light source 222, reflector 224 and lens 226 may function similarly to the same element in the meter of FIGURE 3. However, there is no need for the chopper wheel 60 or its motor 62, because the vibration of the tuning fork 200 provides the necessary dithering effect.

In the operation of the blood alcohol monitor of FIGURE 5, the tuning fork 200 vibrates at a rate which should be optimized to the sensitivity of the thermistor-bolometer 218, probably somewhere between 10 and 50 cycles per second. The tuning fork amplitude must be such as to place first the filter 210 and then the filter 212 in the path of the radiation 223 passing from the radiation source 222 to the sensor 218.

A pickoff 230 of any known type may be mounted upon the tuning fork 200 at any point where it can monitor both the rate and phase of vibration of the fork 200. The exact phase position of the fork 200 as monitored by the pickoff 230 provides one input for the electronics of the monitor set of FIGURE 5.

No potentiometer knob or mechanism is shown in FIGURE 5 because it is contemplated that the electronics of the monitor set in this embodiment will use an automatic gain control (AGC) circuit to standardize the readout of the monitor. The function of the AGC circuit is to vary either the current to the source 22, the gain of the preamp 220, or the reference setting of the readout or printout device being used with the monitor set, to standardize the 100% transmission value (i.e., the reference filter reading) for all subjects being tested. Thus, for a thin finger or a relatively bulky finger, or for very light skin or very dark skin, the signal level would be the same whenever the filter 212 was in the path of the radiation 223.

Figure 6:
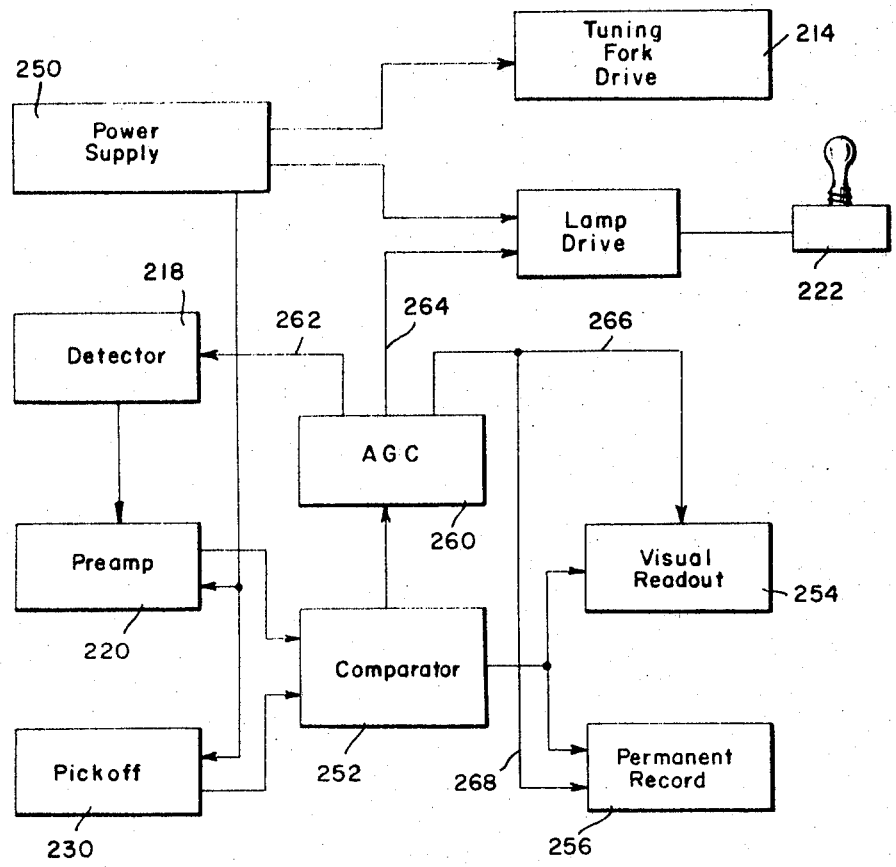
FIGURE 6 is a block diagram of the electronic system for the alternative embodiment.

Referring to FIGURE 6, an electrical system for the blood alcohol monitor set described in FIGURE 5 begins with a power supply 250 which supplies electricity to the pickoff 230, the preamp 220, the tuning fork drive 214, and a drive circuit for the lamp 222. The output of the pickoff 230 is fed to a comparator 252 which also receives output from the preamp 220. The comparator 252 may contain any of a variety of types of electronics whereby a different signal may be derived from the absolute voltages appearing on the detector 218 when first the filter 210 and then the filter 212 are in series with the light path 223. The output of the comparator 252 may be fed to either or both of a visual readout 254 and a recording instrument 256. As stated above, the recording instrument 256 ought to be of a type that makes a punched or other permanent record that can not be tampered with after the fact. The visual readout 254 is useful for on-the-spot determination of the results of blood content monitoring.

The comparator 252 also produces an output for an AGC circuit 260 which, as stated above, has the ultimate function of ensuring that all the blood content readings from various subjects are based upon the same reference scale. Although with a comparison signal this is not as important as when absolute data is being read at 254 or 256, the AGC still is helpful in clarifying readout by continually reshifting signal level so zero reference is always the same when the reference filter 212 is in series with the light path 223. The AGC may perform this function either by changing the characteristics of the detector 218, as represented by the line 262 or by simply changing the current through the lamp 222, as represented by the line 264. The AGC 260 may also work directly by shifting the scale of the visual readout 254 and the permanent record 256 (represented by the lines 266 and 268, respectively).

The above discussion has been couched in terms of blood alcohol monitoring, but the principles of the instant invention apply with equal facility to the monitoring of other substances in the blood stream, especially in the course of police investigation or similar field testing. For example, in narcotics investigation it is important to be able to monitor the presence of heroin or morphine in the blood immediately upon apprehension of a suspect; while for medical purposes it is often essential to have a quick and easy test for diabetes, which can be performed by analyzing the amount of acetone content in the blood stream.

Figure 7A:
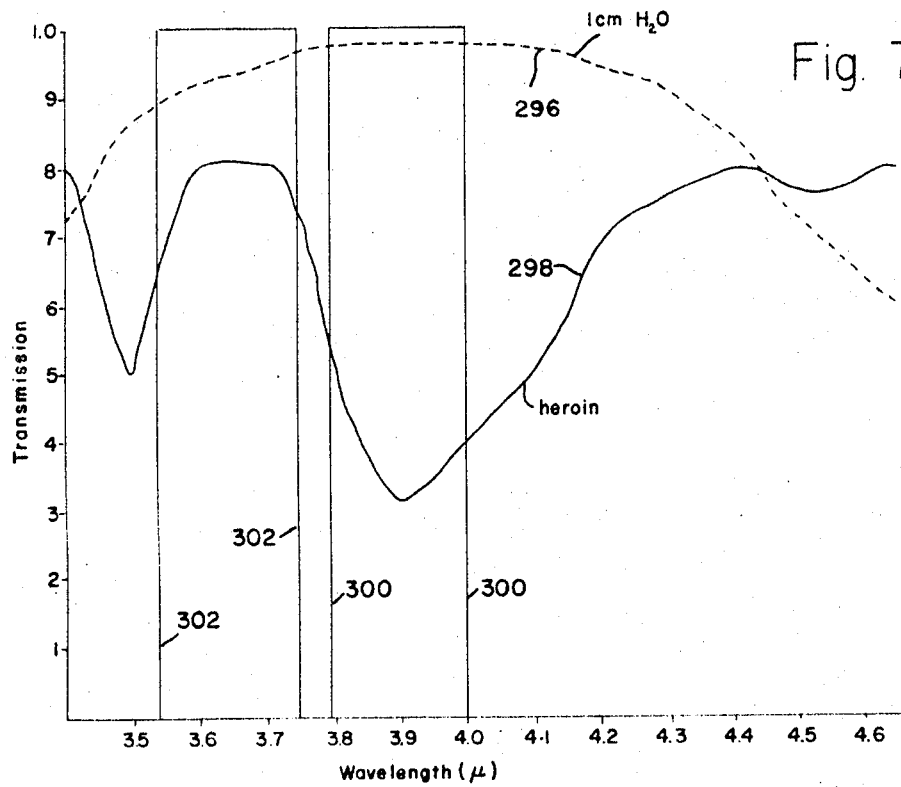
FIGURE 7(a) is a graph illustrating the transmissivity of water and heroin.

FIGURE 7(a) is a graph of wavelengths in microns versus transmission, for both radiation for water and heroin. It can be seen that from approximately 3.8 microns wavelength to 4.0 microns wavelength is a wide band (outlined at 300) where water is quite transparent, while heroin is maximally absorptive. Thus, the band 300 would provide a good wave band for an absorptive filter such as that shown at 122 of FIGURE 3. On the other hand, right next to the 3.8–4.0 micron wave band 300 is a wave band 302, running from approximately 3.55 microns to 3.75 microns, where both water and heroin have their highest levels of transmission. The wave band 302 would obviously make an excellent reference wave band, such as that associated with the reference filter 124 in FIGURE 3.

Figure 7B:
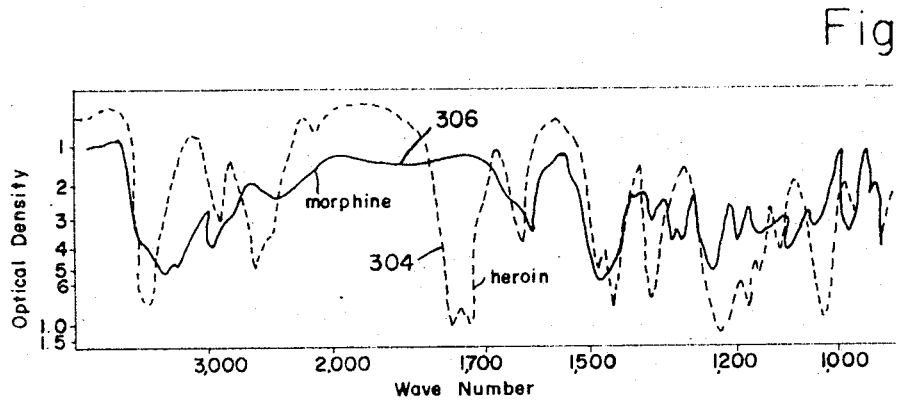
FIGURE 7(b) is a graph of wave numbers versus optical density for both heroin and morphine.

FIGURE 7(b) is a graph of wave number (i.e., millimicrons wavelength) versus optical density (the inverse of transmission or transmissivity) for both heroin (the dotted line 304) and for morphine (the solid line 306). It can be seen that both morphine and heroin have very sharp local drops in their transmissivity; any one of these local drops provides a good band for analysis according to the principles of the instant invention, and the best of these analysis bands can be selected by analyzing the characteristics of water or blood and tissue in the same spectral frequency vicinity.

Figure 7C:
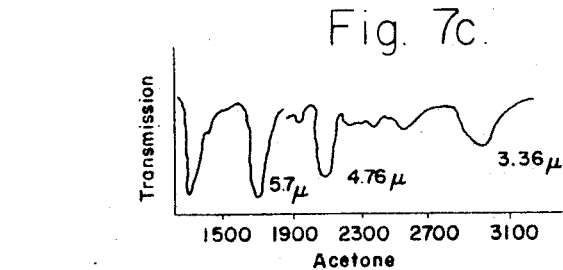
FIGURE 7(c) illustrates the transmissivity of acetone.

FIGURE 7(c) shows the transmissivity of acetone, the indicator of diabetes that is most convenient as an analysis criterion. At 5.7 microns, 4.76 microns, and 3.36 microns wavelength acetone shows sharp local changes in transmissivity which would provide excellent absorption bands for the bandpass filter 122. Since the filters 122 and 124 of FIGURE 3 or the filters of 210 and 212 of FIGURE 5 are easily removed and replaced, one blood content monitor as described herein could be used with interchanging filters to test not only for alcohol, but also for heroin, morphine, or other narcotics, or for acetone, and various other substances which it may be important to locate immediately, quickly, and with a minimum of cooperation from the subject of the test.

It should be noted that various alternative implementations of the inventive principles are possible beyond the preferred embodiments taught herein. For example, numerous other alcohol absorption bands in the infrared region can be used (e.g., around 6.3 microns), or the monitor set could use radiation from outside the infrared region (e.g., ultraviolet). The tuning fork of FIGURE 5 could be replaced with a rotary disc carrying two or more types of filters thereon, either singly, in circumferential or radial tracks, or in any other appropriate arrangement. The potentiometer of FIGURE 3 for the AGC of FIGURE 5 have as alternative replacements any device which effectively "zeroes" the readout or recording scale of the monitor set to a uniform reference level or point when the reference filter is in the circuit; (e.g., dimming the light source 50, recentering the meter 20, or monitoring a pure, unreferenced difference signal).

Another area where more substitution of equivalents should not be taken as avoidance of the inventive principles is the light source 50—any heated filament could be used (Nichrome, platinum, or any high melting point conductor) or any black body or continuous spectrum radiator. Indeed, any radiation source containing the spectral elements necessary for performing a certain type of analysis would serve.

Therefore, although the invention has been described in its preferred form with a certain degree of particularity, it is understood that the present disclosure of the preferred form has been made only by way of example and that numerous changes in the details of construction and the combination and arrangements of parts may be resorted to without departing from the spirit and scope of the invention as hereinafter claimed.

What is claimed is:

1. A fluid content analyzer including:
   first means for passing energy through a fluid to be analyzed;
   the fluid to be analyzed is blood;
   the first means passes radiant energy including infrared frequencies through said blood;
   second means for receiving energy from said first means that has passed through said fluid and producing an electrical signal related to the frequency content of said energy;
   the second means including first and second spectral filters mounted on a tuning fork and alternately vibrated in and out of optical series with said radiant energy source and said fluid by said tuning fork;
   said first spectral filter having a passband in an alcohol-absorptive wavelength of radiant energy and said second spectral filter having a passband at approximately 1.6 microns wavelength of radiant energy; and
   third means electrically connected to the second means for receiving said electrical signal and utilizing said electrical signal to develop an output reading indicative of the energy absorptive substance present in the fluid to be analyzed.

2. An alcohol monitor set for determining the amount of alcohol in a human member including:
   a tungsten filament lamp light source;
   a reflector mounted in operative association with the tungsten filament lamp light source for causing the radiation from the tungsten filament lamp light source to be directed in a desired direction;
   a first filter mounted in the path of light passing from said reflector and said tungsten filament lamp light source for blocking radiation from said tungsten filament light source that is not needed for determining the amount of alcohol in said human member;
   first means for modulating the light from the reflector that is not blocked by the first filter;
   a second filter movable into and out of the path of light from said reflector for passing only radiation that is in a frequency band which is in an absorption band of alcohol and is not greatly absorbed by water;
   a third filter movable into and out of the path of light from said reflector for passing only radiation that is in a frequency band which is not in an absorption band of alcohol and is not greatly absorbed by water;
   said second and third filters are mounted on one prong of a tuning fork and are alternately moved into and out of the path of the light from said reflector by vibration of said fork;
   a radiation intensity detector in the path of light from said human member and having an electrical lead; and
   second means electrically connected to said electrical lead of said radiation intensity detector for deriving a readout indication of blood alcohol in said human member from an electrical characteristic on said electrical lead.

References Cited

UNITED STATES PATENTS

| | | | |
|---|---|---|---|
| 2,051,317 | 8/1936 | Sheard et al. | 88—14 |
| 2,051,320 | 8/1936 | States | 88—14 |
| 2,790,438 | 4/1957 | Taplin et al. | 128—2 |
| 3,136,310 | 6/1964 | Meltzer | 128—2 |
| 3,327,119 | 6/1967 | Kamentsky. | |

FOREIGN PATENTS 745,646   2/1956   Great Britain.

WILLIAM E. KAMM, Primary Examiner

U.S. Cl. X.R.

356—39